United States Patent

[11] 3,539,040

[72] Inventor Frederick Speer Edwards
 Newark, Ohio
[21] Appl. No 814,117
[22] Filed April 7, 1969
[45] Patented Nov. 10, 1970
[73] Assignee Roper Corporation
 Kankakee, Illinois
 a corporation of Delaware

[54] HYDROSTATIC TRANSMISSION, BRAKE AND BELT TIGHTENER WITH INTERRELATED CONTROLS
 8 Claims, 4 Drawing Figs.
[52] U.S. Cl. ............................. 192/4,
 74/477, 188/265, 192/11
[51] Int. Cl. ............................. F16h 57/10
[50] Field of Search ............................. 192/4(B), 4(R),
 4(A), 11

[56] References Cited
UNITED STATES PATENTS
| 307,839 | 11/1884 | Brey | 192/11 |
|---|---|---|---|
| 2,904,146 | 9/1959 | Codlin | 192/4(A) |
| 2,988,185 | 6/1961 | Pond | 192/4(A) |
| 3,349,860 | 10/1967 | Ross | 192/4(B) |

Primary Examiner—Benjamin W. Wyche
Attorney—Frank H Marks and Nathan N. Kraus

ABSTRACT: In a vehicle having braking and de-clutching means operated by a single pedal and a hydrostatic transmission unit. mechanism operatively connected to the pedal and to the control shaft of the transmission unit and operable to return the control shaft to neutral position to render the transmission unit inoperable when the pedal is operated.

Patented Nov. 10, 1970
3,539,040
Sheet 1 of 2
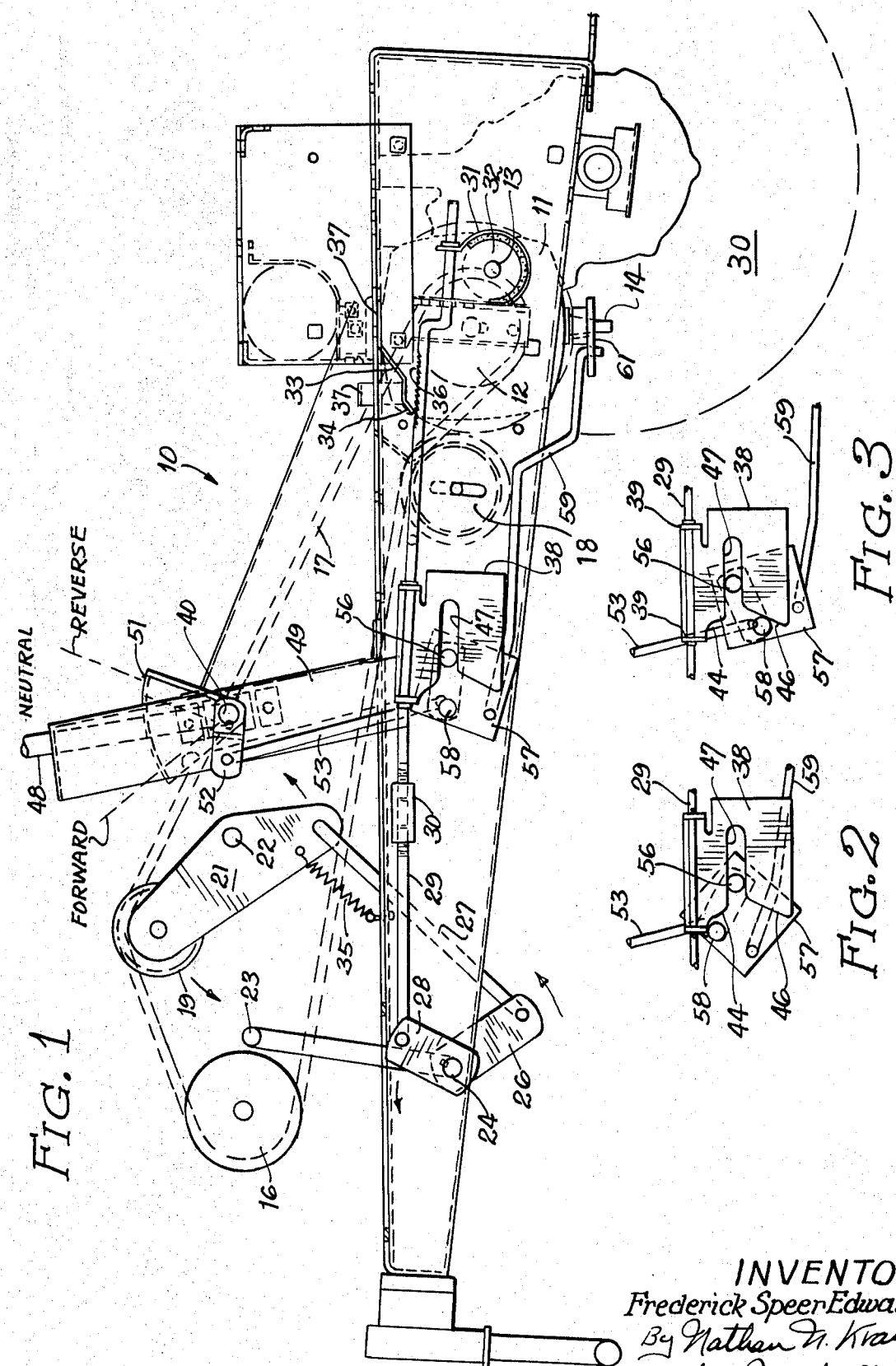
INVENTOR
Frederick Speer Edwards
By Nathan N. Kraus
Frank H. Marks Att'ys

HYDROSTATIC TRANSMISSION, BRAKE AND BELT TIGHTENER WITH INTERRELATED CONTROLS

This invention relates to means associated with a vehicle, such as a riding tractor or the like, having a hydrostatic transmission, for simultaneously effecting, through a single pedal actuation, braking of the vehicle drive shaft, declutching of the vehicle belt drive and neutralization of the hydrostatic transmission.

BACKGROUND OF THE INVENTION

In the operation of riding type tractors and lawn mowers equipped with hydrostatic transmission drives, it is highly desirable to effect return movement of the transmission control means to neutral or nonoperative position concurrently with the application of a braking effort and declutching of the belt drive.

SUMMARY OF THE INVENTION

Accordingly, it is an object of my invention to provide means operatively connected with the brake and declutching pedal for returning the hydrostatic transmission control means to neutral or nonoperative position concurrently with the actuation of the pedal to effect a braking of the vehicle and declutching of the belt drive.

Other and further objects and advantages of this invention will become apparent from the following description when considered in connection with the accompanying drawings.

BRIEF DESCRIPTION OF THE DRAWINGS

FIG. 1 is a fragmentary side elevational view of a tractor embodying my invention.

FIGS. 2 and 3 are fragmentary elevational views of structural details showing different conditions of operation.

DESCRIPTION OF THE PREFERRED EMBODIMENT

Figure 4:
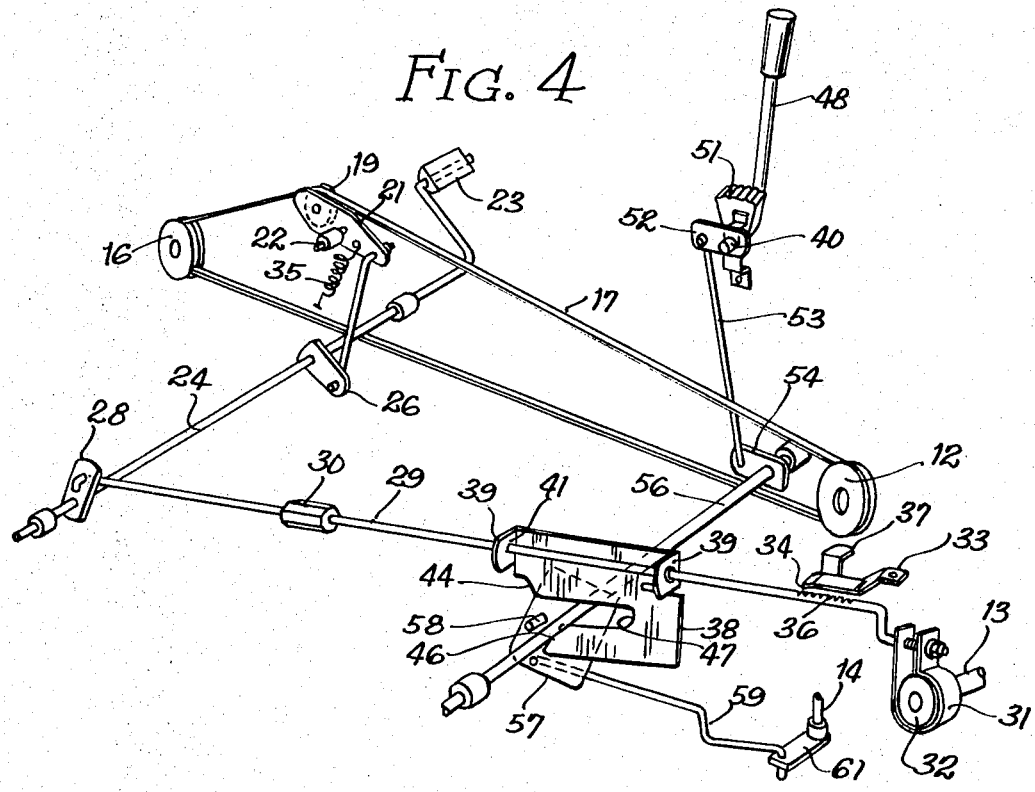
FIG. 4 is a simplified schematic perspective view illustrating the braking, clutching and neutralizing means embodying the invention.

Referring to the drawings, particularly to FIG. 1, my invention is shown applied to a riding-type tractor 10 which incorporates a hydrostatic transmission unit 11 of conventional construction. The transmission unit per se does not form part of the present invention and only those portions of the unit, specifically the input drive pulley 12, the output shaft 13 and the control shaft 14 of the unit will be identified. The input pulley 12 is driven by engine pulley 16 through a belt 17. The belt is trained over an adjustable idler pulley 18 and also over a belt tightening idler pulley 19 supported on a bracket 21 pivoted as at 22 on a portion of the frame of the tractor. A foot pedal 23 is rigidly connected to a shaft 24 suitably journaled in the frame and having affixed thereto an arm 26 connected by a link 27 to the idler bracket 21. The shaft 24 has fixed thereon a second arm 28 which is connected through brake rod 29 to brake band 31 circumposed about the brake drum 32 fixed on output shaft 13. The brake rod 29 is split and provided with an adjusting nut 30 for varying the length of the brake rod. It will be apparent that depressing of the foot pedal 23 in a counterclockwise direction, as viewed in FIGS. 1 and 4, will effect rocking of the bracket 21 in a similar direction to move the pulley 19 to nonbelt tightening or declutched position so that no power is transmitted between the engine pulley 16 and the input pulley 12. Correspondingly, the arm 28 is rocked in a counterclockwise direction to effect contraction of the brake band 31 about the drum 32 to arrest movement of output shaft 13 which is connected to the traction wheels 30 of the tractor. The brake drum 31 may be locked in this position by manipulation of a resilient brake rod catch 33 suitably mounted on the chassis of the tractor preferably beneath the seat of the operator. The catch 33 is provided with a tooth 34 which is adapted to engage one of a series of teeth 36 provided on the brake rod 29. The catch 33 is provided with a thumb engaging portion 37 easily accessible to the operator of the vehicle, so that locking of the rod 29 while the brake band 31 is tensioned may be readily effected. It will be understood that the pedal 23 and pulley 19 normally are biased by a spring 35 to belt tightening position. Accordingly, the brake rod 29 is urged to the right, as viewed in FIG. 4 corresponding to nonbraking position of the band 31. As a result the tooth 34 will be maintained in engagement with one of the teeth 36 while the brake band 31 is under tension. In order to release the locking means, it is merely required to depress the pedal 23 so that the tooth 34 may be urged by the normal resilience of the catch 33 to nonengaging position.

A cam plate 38 is provided with a pair of laterally extending ears 39 which are provided with registering openings 41 to receive the brake rod 29. The cam plate 38 is secured to the rod 29 against relative longitudinal movement, as with cotter pins passed through the rod adjacent the ears 39. Thus, the cam plate 38 moves together with the rod 29. As will be seen clearly in FIGS. 2 and 3, the cam plate 38 is provided on its forward edge with camming portions 44 and 46 disposed on opposite sides of a longitudinally extending slot 47.

A control lever 48 is pivotally supported in an upright arm 49 rigid with the frame of the tractor. The arm 49 has fixed thereto a quadrant plate 51 provided with the usual detent notches adapted to be engaged by a conventional cooperating finger controlled spring biased member, not shown, for locking the lever 48 in a position of adjustment relative to arm 49. The lower end 40 of the lever 48 extends laterally and is journaled in the arm 52. An arm 52 is welded to lever end 40. Said arm is connected by means of a link rod 53 to an arm 54 welded to a shaft 56 journaled in the frame of the tractor. A rock plate 57 is welded to shaft 56 and carries a laterally extending cam follower pin 58 adapted to cooperate with the cam surfaces 44 and 46. The plate 57 is connected by means of a link rod 59 to a lever 61 fixed on the control shaft 14 of the hydrostatic transmission. It will be apparent that movement of the control lever 48 through shaft 56 will effect movement of the control shaft 14 to effect forward or reverse operation of the tractor. In such movement, the rock plate 57 and pin 58 will assume different positions in relation to the camming surfaces 44 and 46. For example, referring to FIG. 2, the position assumed by the pin 58 corresponds to the position assumed by the lever 48 for reverse operation of the tractor. Referring to FIG. 3, the position assumed by the pin 58 corresponds to the position assumed by the lever for forward operation of the tractor. In neutral or nonoperating position, the pin 58 assumes the position illustrated in FIG. 1, wherein it is substantially horizontally aligned with the shaft 56 and clearance slot 47, so that the pin 58 is unaffected by any movement of the cam plate 38 to the left, as viewed in FIG. 1.

In operation, the belt 17 normally is maintained in tightened or clutched condition so that power may be transmitted from the engine pulley 16 to the input pulley 12 of the hydrostatic transmission unit. In such condition, the foot pedal 23, of course is at its uppermost position and the brake band 31 is in relaxed condition in relation to the brake drum 32. Assuming that the transmission control is in neutral position, as illustrated in FIG. 1 the operator may then shift the lever 48 forwardly to effect rocking of the rock plate 57 in a counterclockwise direction from the position illustrated in FIG. 1, to that illustrated in FIG. 3 to operate the vehicle in a forward direction. Conversely, the operator may shift the control lever 48 rearwardly to effect reverse rocking of the plate 57 to the position illustrated in FIG. 2, so as to cause the vehicle to operate in a reverse direction. In either case, the vehicle will move in response to the controlled direction determined by the position of lever 48 as reflected in the position of the control shaft 14. When the operator desires to arrest the movement of the vehicle he depresses the pedal 23 which causes the idler pulley 19 to be rocked counterclockwise, as viewed in FIG. 1, to loosen the belt 17 and, accordingly, effect a declutching action. Correspondingly, lever 28 is rocked counterclockwise, as viewed in FIG. 1, drawing the brake rod 29 to the left and effecting a tightening of the brake band 31 about the brake drum 32. This causes the cam plate 38 to move to the left, as viewed in FIG. 1, so that either of the camming surfaces 44 or 46 will engage against the pin 58 and rock the plate 57 to the neutral position illustrated in FIG. 1, correspondingly rocking the control shaft 14 to neutral position so as to render the transmission unit ineffective. When the pedal 23 is released, the brake band 31 is relaxed and the cam plate 38 is caused to return to normal nonoperative position.

It will be apparent from the foregoing that I have provided an arrangement wherein the transmission unit is automatically reset to a neutral condition and the engine is declutched when the pedal is operated to effect a braking action.

Various changes coming within the spirit of my invention may suggest themselves to those skilled in the arts; hence, I do not wish to be limited to the specific embodiment shown and described or uses mentioned, but intend the same to be merely exemplary, the scope of my invention being limited only by the appended claims.

I claim:

1. In a vehicle having a hydrostatic transmission unit having a control shaft.
    a. clutch means;
    b. braking means;
    c. actuating means;
    d. said actuating means being operatively connected with said clutch means and said braking means whereby when said clutch means is rendered ineffective said braking means is rendered effective;
    e. control means for operating said control shaft;
    f. camming means associated with said actuating means;
    g. cam follower means associated with said control means; and
    h. the movement of said actuating means to render said clutch means ineffective and said brake means effective effecting engagement of said camming means with said cam follower means to move said control shaft to neutral nonoperating position.

2. The invention as defined in claim 1 in which the actuating means includes a rod connected to said braking means and supporting said camming means.

3. The invention as defined in claim 2 in which said camming means comprises a plate fixed on said rod and having camming surfaces along one edge thereof.

4. The invention as defined in claim 1 in which the control means includes a rockable shaft having an arm fixed thereon and operatively connected to the control shaft, with the arm carrying the cam follower means.

5. The invention as defined in claim 1 in which the actuating means includes a pedal connected to a shaft, the shaft having a pair of fixed arms one of which is connected to the clutch means and the other of which is connected to the braking means by a rod, and in which the camming means is carried on said rod.

6. The invention as defined in claim 5 in which the camming means comprises a plate having camming surfaces along one edge thereof and in which the cam follower means includes an arm connected to the control shaft and carrying a pin engageable by the camming surfaces.

7. The invention as defined in claim 5 in which the control means includes a rockable shaft having an arm fixed thereon and operatively connected to the control shaft with the arm carrying a pin engageable by the camming surfaces.

8. The invention as defined in claim 1 in which the clutch means comprises a belt and idler pulley arranged to effect tightening or slackening of the belt.